UNITED STATES PATENT OFFICE 2,418,465

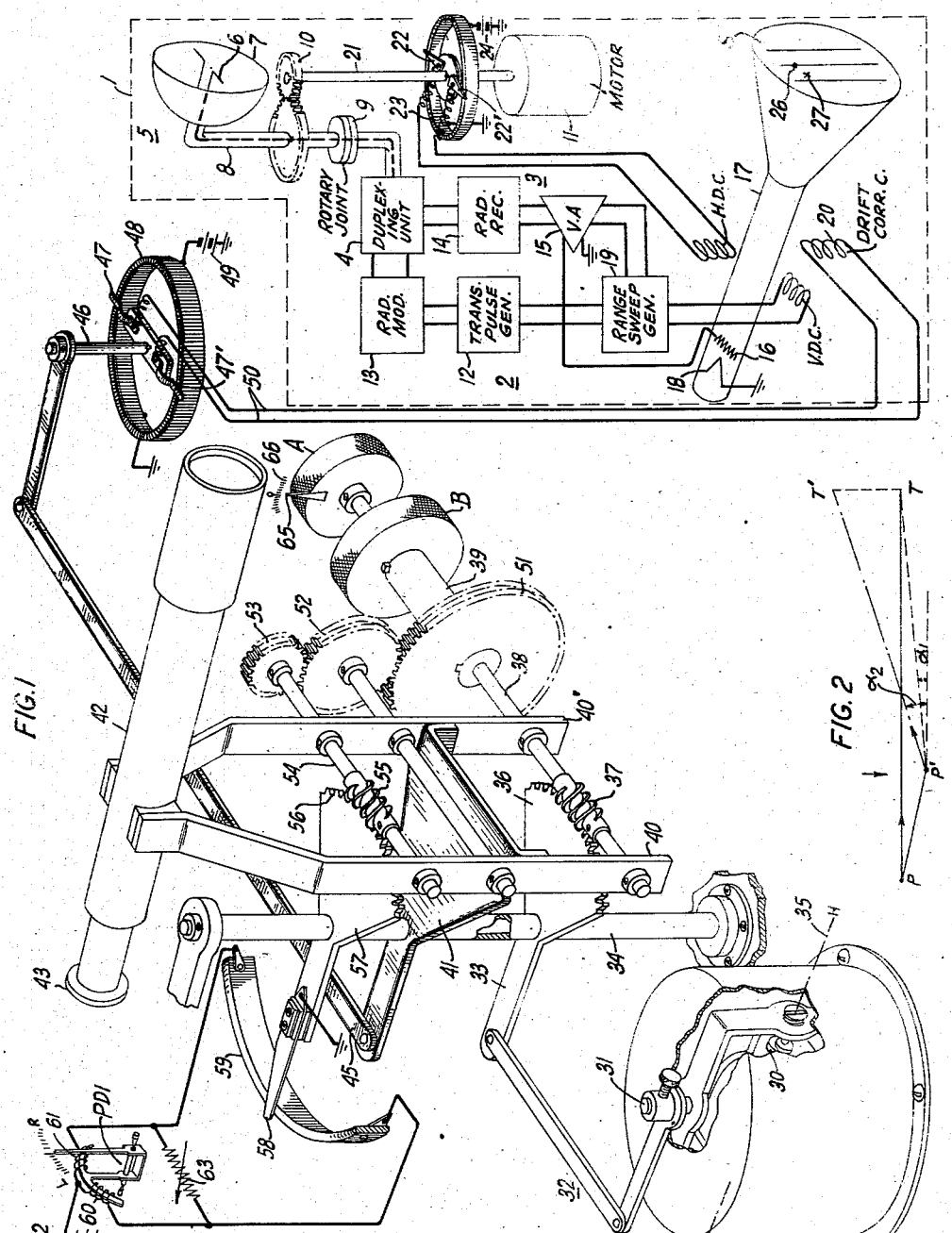

DRIFT METER

Stephen Doba, Jr., Long Island City, N. Y., assignor to Bell Telephone Laboratories, Incorporated, New York, N. Y., a corporation of New York Application March 21, 1944, Serial No. 527,460

4 Claims. (Cl. 250—1)

This invention relates to an improvement in navigational aids of the kind known as drift meters, and is particularly useful in aircraft required to fly through a cross-wind toward a destination ahead visible or invisible. The invention is applicable also to surface ships exposed to cross-winds or currents.

The general object of the invention, therefore, is to facilitate navigation at sea or in the air.

Optical devices are known which enable the pilot of an aircraft to estimate drift provided he is flying over a visible surface marked with a recurrent pattern such as ripples or waves on water, but which are useless at night or in fog. The present invention replaces optical drift meters and makes use of electrical object locating and ranging systems of the radar type which are independent of weather or light. It is accordingly another object of the invention to provide means for the detection and measurement of drift in all conditions of navigation.

The invention makes use of means known in connection with optical devices for compensating the cross-drift by appropriate changes in heading, say, of an airplane, whereby the altered heading compounded with the drift results in a course made good directly from the point of compensation to the desired destination ahead of that point. The adaptation of such compensating means to blind flying is also an object of the invention.

The departure from the direct course desired may result from cross-wind or current or may be required to compensate movement across the initial line of sight by an enemy target which is to be bombed from an airplane. In such bombing a direct course toward the target is required and thus another object of the invention is to enable a bombing airplane to fly under all conditions a collison course toward an enemy target. By "collision course" is meant a course in a vertical plane including the airplane and the target. In flying such a course, the requisite heading is prescribed by the bombardier, as later explained, and is maintained by the pilot of the airplane.

The above-stated objects are accomplished by the present invention as will be clear from the following description of the accompanying drawing, in which:

Fig. 1 illustrates a preferred organization of the apparatus of the invention in association with known optical and electrical devices, the specific apparatus of the invention being drawn in bold lines; and Fig. 2 is a diagram illustrative of the method involved.

In Fig. 1 a radar system of a known type, enclosed within the dash line generally indicated by numeral 1, includes a pulse transmitting circuit 2 and a pulse receiving circuit 3 connected through a duplexing unit 4 to a common antenna 5. Antenna 5 is preferably of the highly directive type consisting of a small polarized dipole 6 at the focus of a parabolic reflector 7 and is connected by a coaxial link 8 through duplexing unit 4 to the circuits 2 and 3 with a rotary joint 9 in link 8. The portion of link 8 above joint 9 is provided with gearing 10 through which motor 11 is enabled to rotate antenna 5 in the horizontal plane at constant speed. It is to be understood that for rotation of antenna 5 in a vertical plane a second rotary joint, at right angles to joint 9, may be provided so that a second motor through a second gearing may produce such rotation. The required additional joint, gearing and motor are not shown.

In the radar system illustrated, pulse generator 12 controls radio modulator 13 to supply at a convenient rate of repetition extremely short and intense pulses of radio frequency energy to be directively radiated by antenna 5. Duplexing unit 4 which may be an automatic transmit-receive switch of any known type, effectively short-circuits the input to receiving circuit 3 during the transmission of intense radiation from antenna 5 while allowing free passage to circuit 3 of the low level energy received by antenna 5 after reflection from the target of the radiation transmitted. The interval between successive emissions of radiations of antenna 5 is made more than long enough for the reception of radio echoes from the most distant target to be considered.

The target in the path of the rotating beam from antenna 5 reflects, usually diffusely, a portion of the incident radiation. Antenna 5 intercepts and transforms into an electrical pulse a portion of this reflected energy, received during the interval between successive pulses of emitted radiation, and the received pulse so transformed passes through duplexing unit 4 to radio receiver 14 in the circuit 3 where it is amplified and detected. After detection the echo pulse is further amplified by video amplifier 15 and is thereupon applied to intensity grid 16 of a cathode ray oscilloscope 17 to produce intensity modulation of the cathode ray beam. Conveniently, oscilloscope 17 is the well-known type in which the cathode beam deflection is magnetically controlled and oscilloscope 17 is not shown in detail other than grid 16, cathode 18, deflecting coils HDC and VDC for horizontal and vertical beam deflection, respectively, fluorescent screen S and drift correction 20, supplementing as later explained horizontal deflection coil HDC.

In synchronism with the pulses supplied to modulator 13, pulse generator 12 supplies trigger pulses to sweep generator 19 which produces a saw-tooth voltage to be applied to the terminals of coil VDC and also an unblanking pedestal pulse to amplifier 15 whereby that amplifier is enabled only during the sweep interval to render grid 16 unbiased. Thereby the reflected signal is caused to appear as a bright spot on screen S at a point in the vertical sweep elevated above the sweep starting point a distance corresponding to the time of transmission of the emitted pulse to the target and back, that is, to the range of the target. Conveniently the sweep is made to start from a point near the bottom of screen S. For this purpose a permanent magnet, not shown, may be used to provide the initial bias of the cathode ray beam. Means, not shown, for centering horizontally on screen S the sweep starting point are provided.

Shaft 21, through which motor 11 drives gear 10 carries a pair of potentiometer wipers 22 and 22', insulated from each other and from shaft 21 and traversing potentiometer 23 fixed in the airplane. Across diametrically opposite points of potentiometer 23 is connected battery 24 and wipers 22 and 22', directly opposite to each other and rotating with shaft 21, select a fraction of the voltage of battery 24 ranging from zero when antenna 5 is directed precisely forward of the plane to a maximum when antenna 5 points abeam, the polarity of this maximum depending on the left or right pointing of antenna 5. The voltage selected by wipers 22 and 22' is applied to produce a current in horizontal deflecting coil HDC of oscilloscope 17 whereby the cathode ray beam is deflected to the left or to the right of the screen in synchronism with antenna 5.

The intensity modulation of the cathode ray beam by the echo pulse from the target thus causes an electron spot representing that target to appear on screen S at a height above the bottom thereof corresponding to the target range and in horizontal position corresponding to the target bearing. The potentiometer 23 is so installed with respect to wipers 22 and 22' that the representative spot is horizontally centered on screen S when the radar beam from antenna 5 points dead ahead. Three vertical lines on screen S, one through the center, represent target bearings 6 degrees left, dead ahead, and 6 degrees right, respectively.

On screen S dot 26 indicates a target echo spot horizontally centered on the screen corresponding to a target directly ahead at a moment of observation, while dot 27 indicates the position taken by the target spot shortly afterwards. Dot 27 is lower than dot 26 because the target range has decreased due to the airplane's motion and is at the same time horizontally shifted by reason of a cross-drift operating on the plane and causing the target to bear slightly to one side of dead ahead. The angular deviation of the target may be estimated from the spot position horizontally on screen S.

To the radar apparatus above briefly described, the apparatus of the present invention is applied as follows:

Gyroscope 30, which may be of any known type, is connected through shaft 31 to linkage 32 controlling the orientation of plate 33 which is free to rotate about shaft 34 fixed in the plane in a direction at right angles to the axis of rotation 35 of gyroscope 31. Plate 33 has generally the form shown in Fig. 1 and terminates at one end in toothed sector 36.

Brackets 40 and 40', fixed to plate 41 also rotatable about shaft 34, support at their upper extremities an optical sighting device represented schematically by telescope 42 of which eyepiece 43 carries the usual hair lines for sighting on a distant object. Brackets 40 and 40' carry at their lower extremities worm 37 meshed with sector 36. The gyroscope will, if the bombardier does not intervene, maintain the linkage 32 and the optical axis of telescope 42 in a vertical plane fixed in direction. Such apparatus is known to the art.

Plate 41 is connected at its narrow end to linkage 45 which controls through shaft 46 the angular position of wipers 47 and 47'. These wipers are mounted oppositely to each other on shaft 46, are insulated therefrom and from each other and traverse potentiometer 48. From what has been said it will be clear that the absolute angular position of wipers 47 and 47' is also maintained fixed by gyroscope 30 independently of the bearing of the plane. Potentiometer 48 is fixed in the plane and connected at opposite ends of one diameter to the terminals of battey 49. From wipers 47 and 47' leads 50 are brought to the terminals of compensating coil 20.

Horizontal deflecting coil HDC carries no current when antenna 5 is directed forward. Likewise wipers 47 and 47' are initially so set that no current flows in coil 20 when the telescope is pointing dead ahead. If now the airplane is turned about a vertical axis while moving directly toward a target represented by dot 26, this dot will leave the vertical line through the center of screen S because antenna 5 is no longer pointed ahead when it intercepts a reflected pulse from the target. At the same time, however, brackets 40 and 40' will have turned about shaft 34 being controlled from gyroscope 30 through linkage 32 and will, through linkage 45, rotate shaft 46 causing wipers 47 and 47' to apply a fraction of the voltage of battery 49 to leads 50. A current thus flows in compensating coil 20 and by suitable choice of voltage and poling of battery 49 this current can be adjusted to compensate the deflection of dot 26 due to current in coil HDC. It results that dot 26 will remain horizontally centered but vertically progressively lower as the plane approaches the target in a straight line.

Referring now to Fig. 2, suppose that a given moment when the plane is at point P, dot 26 is horizontally centered and the plane is headed directly toward the target T in a cross-wind. At a later moment the plane will have reached P' and the target will bear left, say by the angle $\alpha_1$ degrees. The heading is unchanged so that coil 20 is currentless but dot 26 has moved from the central vertical line of screen S because the target is no longer ahead and the cathode ray trace is brightened when antenna 5 points $\alpha_1$ degrees left.

It remains to explain how the present invention enables the bombardier to intervene by manipulation of brackets 40 and 40' to recenter dot 26 and to prescribe to the pilot the heading on which to fly the desired course.

Referring again to Fig. 2, it is clear that to overcome the cross-drift to fly the course P'T, the plane must head toward point T'. The proportions of the diagram of Fig. 2 are of course exaggerated and the actual angle P"T'T is much nearer to 90 degrees than is there shown. The distance T'T is the drift in the flight time from P' to T, and the leeway to be overcome is the angle T"P'T which equals the angle P'PT. The course made good is from P' to T oblique to the apparent heading from P' to T'. The drift is overcome by altering the plane's heading through an angle which is the sum of the leeway to be compensated and the bearing at P' of the target with respect to the original heading. If this bearing is as above designated $\alpha_1$ degrees and the change in heading is $\alpha_2$ degrees, the leeway is $\alpha = \alpha_2 - \alpha_1$ degrees and the cross-wind velocity is $v \tan \alpha$, where $v$ is the speed of the plane with respect to the air in which it flies.

Worm 37 is carried on shaft 38 terminating in knob A. Concentric with shaft 38 but free to turn with respect thereto is sleeve 39 terminating at one end in knob B, which may be grasped at the same time as knob A, and at the other end in gear 51. Any rotation of knob B and with it of gear 51 is multiplied by gears 52 and 53 the latter of which terminates shaft 54 supported as shown in brackets 40 and 40'. Between these brackets, shaft 54 carries worm 55 engaging sector 56 at one end of plate 57, which is mounted to turn freely on vertical shaft 34 as are plates 33 and 41. The narrow end of plate 57 carries potentiometer wiper 58 insulated from plate 57 and grounded.

The bombardier, observing that dot 26 has moved to the place indicated by dot 27 may turn only knob A. In this case he rotates brackets 40 and 40' around shaft 34 thereby through link 45 adding a differential rotation of wipers 47 and 47' on potentiometer 48. This results in a current through compensating coil 20 to recenter horizontally dot 26 on screen S. The bearing of target P will now appear to be dead ahead when it is actually $\alpha_1$ degrees left. The rotation of brackets 40 and 40' entails a corresponding movement of plate 57 and wiper 58.

Wiper 58 sweeps over resistance 59 which is in series with coils 60 and 61, the needle deflecting coils of the pilot's direction indicator PDI. The junction of coils 60 and 61 is connected to one terminal of battery 62, the other terminal of which is grounded. Obviously the shift of wiper 58 on resistance 59 results in a deflection of the needle of indicator PDI to one side or the other of zero which constitutes an order to the pilot to change heading until the needle again reads zero. Battery 62 is so poled that the deflection leads to a change of heading to the left, in the situation illustrated in Fig. 2, and the sensitivity of the pilot's direction indicator PDI may be controlled in this regard by adjustment of variable resistance 63 bridged across the terminals of resistance 59.

The correction of heading so obtainable is not enough for a collision course from point P'. It is seen from Fig. 2 that the angle $\alpha_2$ must be larger than angle $\alpha_1$. Accordingly, knob B must also be turned. Then, by reason of the step-up ratio of gears 51, 52 and 53, worm 55 causes plate 57 to rotate without motion of brackets 40 and 40'. In practice knobs A and B may be turned together. The bombardier's procedure in correcting the course is as follows:

At point P' he observes the target to bear left. Thereupon he grasps both knobs A and B, recentering the target spot on screen S and at the same time prescribing a change of heading by the deflection of the needle of the pilot's direction indicator. The change prescribed is N times the target bearing corrected by tuning knob A, N being determined by the gear ratio of gears 51—52—53 and the relative sensitivities of the horizontal deflecting coil HDC and drift correction coil 20. If the new heading is correct for a collision course from P' to T, the plane will fly the distance P'T' with respect to the air and in the time of this flight will drift to reach actually point T. The course made good will be P'T; the leeway will be the angle T'P'T, or the difference between the change in heading made at P' and the target bearing corrected at that point. That is, the leeway is $(N-1)\alpha_1$. The plane will be at every moment moving towards the target and dot 26 will stay on the vertical line through the center of screen S.

If the new course is not correct, the target spot will presently be observed to move either left or right of the central vertical line of screen S and recorrection is necessary. This second operation corrects a new bearing error $\alpha'_1$ and if the heading is now correct for a collision course the true leeway is $N-1$ times the net rotation of knob A. Radial pointer 65 attached to knob A moves over circular arc 66 concentric with that knob and granduated to read $N-1$ degrees for each degree of rotation of knob A. The final setting of knob A therefore provides on arc 66 a reading of the leeway. The graduations of arc 66 are left and right from a zero corresponding to the setting of knob A which causes no current in coil 20 when the plane is headed directly toward the target.

The above procedure makes use of an electrical object locating and ranging device of the radar type and thus is successful in all weather, at night as well as by day. When flying in daylight, the bombardier may use telescope 42 to obtain the bearing of the target and correct the course by manipulation as already described of knobs A and B. Such use of telescope 42, controlled as in Fig. 1 by gyroscope 30, and the differential operation of knobs A and B are known to the art. Likewise known are radar systems such as the one described. The present invention, by introducing link 45 to control wipers 47 and 47' to produce a recentering current in coil 20, enables the radar system to replace the optical bombsight and thus provide the bombardier with drift detecting and compensating means independent of flight conditions.

What is claimed is:

1. Means for compensating the drift of a vessel moving in a cross-current toward an object ahead comprising, in combination, electrical means for observing the object including a cathode ray oscilloscope provided with a screen on which the object is represented by a luminous spot positioned horizontally in accordance with the bearing of the object, a directional gyroscope, an adjustable linkage connected to the gyroscope electrical means controlled through the linkage by the gyroscope for rendering the horizontal position of the spot independent of the changes in heading of the vessel whereby change in said position becomes indicative of drift, means for measuring the angular change of bearing of the object corresponding to a horizontal change in spot position, means for adjusting the linkage to cancel said horizontal change and means for prescribing an angular change in heading of the vessel opposite to and a multiple of said angular change of bearing.

2. Means for measuring the leeway of a vessel moving in a cross-current toward an object ahead comprising in combination, electrical means for observing the object including a cathode ray oscilloscope provided with a screen on which the object is represented by a luminous spot positioned horizontally in accordance with the bearing of the object, a directional gyroscope, an adjustable linkage connected to the gyroscope electrical means controlled through the linkage by the gyroscope for rendering the horizontal position of the spot independent of the changes in heading of the vessel whereby change in said position becomes indicative of drift, means for measuring the angular change of bearing of the object corresponding to a horizontal change in spot position, means for adjusting the linkage to cancel said horizontal change, means for prescribing an angular change in heading of the vessel overcoming the leeway, and means for measuring the angular difference between the prescribed change in heading and the measured change of bearing.

3. For an airplane flying in a cross-wind toward a target, means for flying a ground course confined to a vertical plane including the target comprising in combination electrical means for observing the target including a cathode ray oscilloscope provided with a screen on which the target is represented by a luminous spot positioned horizontally in accordance with the bearing of the target, a directional gyroscope, an adjustable linkage connected to the gyroscope, electrical means controlled through the linkage by the gyroscope for rendering the horizontal position of the spot independent of the heading of the airplane whereby change in said position denotes the effect of cross-wind, means for measuring the angular change in target bearing corresponding to a horizontal change in spot position, means for adjusting the linkage to cancel said horizontal change and means for prescribing an angular change in heading of the airplane thereafter to maintain the spot horizontally in unchanging position.

4. In a system of apparatus for observing the bearing of an object relative to a moving vessel, said system comprising electrical means for observing the object including a cathode ray oscilloscope provided with a screen on which a luminous spot represents the object and electrical means for controlling the horizontal position of the spot to indicate the bearing of the object relative to the heading of the vessel, means for rendering the spot location independent of the heading comprising additional electrical means for horizontally controlling the spot, gyroscopic means for establishing a fixed horizontal direction and means subjecting the additional means to the control of the gyroscopic means to deflect the spot horizontally on the screen oppositely and proportionally to a change in heading of the vessel.

STEPHEN DOBA, JR.

REFERENCES CITED

The following references are of record in the file of this patent:

UNITED STATES PATENTS

| Number | Name | Date |
|---|---|---|
| 1,958,259 | Becker | May 8, 1934 |
| 2,207,709 | Bates | July 16, 1940 |
| 2,262,033 | Moseley | Nov. 11, 1941 |
| 2,201,174 | Harding et al. | May 21, 1940 |
| 2,247,294 | Goble et al. | June 24, 1941 |
| 2,280,117 | Crane et al. | Apr. 21, 1942 |